United States Patent
Chommeloux et al.

(10) Patent No.: US 8,327,522 B2
(45) Date of Patent: Dec. 11, 2012

(54) PROCESS FOR THE COLLECTIVE FABRICATION OF CALIBRATION-FREE SENSORS BASED ON ACOUSTIC WAVE DEVICES

(75) Inventors: Luc Chommeloux, Le Cannet (FR); Raphael Lardat, Roquefort-les-Pins (FR); Sylvain Ballandras, Besancon (FR)

(73) Assignee: Senseor, Valbonne (FR)

( * ) Notice: Subject to any disclaimer, the term of this patent is extended or adjusted under 35 U.S.C. 154(b) by 612 days.

(21) Appl. No.: 12/445,712

(22) PCT Filed: Oct. 17, 2007

(86) PCT No.: PCT/EP2007/061075
§ 371 (c)(1),
(2), (4) Date: Apr. 15, 2009

(87) PCT Pub. No.: WO2008/046850
PCT Pub. Date: Apr. 24, 2008

(65) Prior Publication Data
US 2010/0313398 A1     Dec. 16, 2010

(30) Foreign Application Priority Data
Oct. 17, 2006  (FR) ..................................... 06 09076

(51) Int. Cl.
*H04R 31/00* (2006.01)
(52) U.S. Cl. ............. 29/595; 29/609.1; 29/852; 29/882; 73/514.16; 73/514.29; 73/514.34; 310/313 B; 310/313 R; 310/358; 310/359; 333/193; 333/194; 333/195

(58) Field of Classification Search .................. 29/25.35, 29/592.1, 594, 595, 609.1, 844, 852, 882; 310/313 B, 313 R, 329–332, 358, 359; 333/193–195; 73/514.16, 514.29, 514.34
See application file for complete search history.

(56) References Cited

U.S. PATENT DOCUMENTS
5,786,303 A * 7/1998 Mansour ...................... 505/210
(Continued)

FOREIGN PATENT DOCUMENTS
WO   WO2005103639   11/2005

OTHER PUBLICATIONS
Buff, W. et al., "Universal Pressure and Temperature SAW Sensor for Wireless Applications", Ultrasonics Symposium Proceedings, vol. 1, 1997, pp. 359-362, XP002435990.

*Primary Examiner* — Paul D Kim
(74) *Attorney, Agent, or Firm* — Lowe, Hauptman, Ham & Berner, LLP (57) ABSTRACT

The invention relates to a process for the collective fabrication of a remotely interrogable sensor having at least one first resonator and one second resonator. Each resonator exhibits respectively a first and a second operating frequency. A first series of first resonators are fabricated. The first resonators each have a first operating frequency belonging to a first set of frequencies centered on a first central frequency. A second series of second resonators are fabricated. The second resonators each having a second operating frequency belonging to a second set of frequencies centered on a second central frequency. A series of pairings of a first resonator and of a second resonator are conducted so as to form pairs of resonators exhibiting a difference of operating frequencies which is equal to the difference of the first and second central frequencies.

19 Claims, 4 Drawing Sheets

U.S. PATENT DOCUMENTS

| | | | |
|---|---|---|---|
| 6,316,861 B1 | 11/2001 | Ballandras et al. | |
| 6,556,419 B2 * | 4/2003 | Suzuki et al. | 361/303 |
| 6,786,095 B2 * | 9/2004 | Tabota | 73/514.29 |
| 7,116,186 B2 * | 10/2006 | Chen | 333/126 |
| 7,126,251 B2 | 10/2006 | Solal et al. | |
| 7,134,339 B2 * | 11/2006 | Mikado et al. | 73/514.29 |
| 7,194,906 B2 * | 3/2007 | Mikado et al. | 73/514.34 |
| 7,353,707 B2 * | 4/2008 | Mikado et al. | 73/514.34 |
| 7,379,629 B1 * | 5/2008 | Burns | 385/12 |
| 2002/0135270 A1 | 9/2002 | Ballandras et al. | |
| 2007/0063622 A1 * | 3/2007 | Rudy | 310/341 |

* cited by examiner

PROCESS FOR THE COLLECTIVE FABRICATION OF CALIBRATION-FREE SENSORS BASED ON ACOUSTIC WAVE DEVICES

CROSS-REFERENCE TO RELATED APPLICATIONS

The present Application is based on International Application No. PCT/EP2007/061075, filed on Oct. 17, 2007, which in turn corresponds to French Application No. 06 09076, filed on Oct. 17, 2006, and priority is hereby claimed under 35 USC §119 based on these applications. Each of these applications are hereby incorporated by reference in their entirety into the present application.

FIELD OF THE INVENTION

The field of the invention is that of remotely interrogable passive sensors and notably of temperature sensors, based on surface or bulk acoustic wave resonators.

BACKGROUND OF THE INVENTION

For example, such sensors are composed of an interrogation unit (itself consisting of an emitting part and of a receiving part) and of a surface acoustic wave temperature sensor commonly known as an SAW (surface acoustic wave) sensor. The interrogation system as well as the SAW sensor are furnished with an antenna suited to the working frequency band (ISM band 433 MHz, 868 MHz, 2.45 GHz, etc.) thereby making it possible to perform wireless interrogation of the sensor.

The mode of interrogation is as follows: The emitter of the interrogation system dispatches an interrogation signal (low-frequency temporal pulse of a carrier in the ISM band) to the SAW sensor. The SAW device is of resonator type thereby making it possible to access structures of reduced size.

If the emission signal exhibits a resonant frequency that is sufficiently close to the natural frequency of the SAW resonator, the latter starts to resonate while passing through a load period. A steady state oscillation is then set up at the natural resonant frequency of the SAW device. This resonant frequency is proportional to the speed of the surface wave in the resonant cavity which itself depends on the temperature which the resonator is at.

The sensor re-emits a signal at its resonant frequency which carries the information related to the quantity to be measured, for example the temperature.

The receiver of the interrogation system detects outside of the emission time span all or part of the SAW signal (damped oscillation) and extracts therefrom the information sought, for example the temperature, via suitable signal processing.

Typically, the resonator is composed of an interdigitated comb transducer, consisting of an alternation of electrodes of widths which repeat with a certain periodicity called the metallization period deposited on a piezoelectric substrate which may advantageously be quartz. The electrodes, advantageously aluminum electrodes (made by a photolithography process), have a small thickness compared with the metallization period (typically, a few hundred nanometers to a few micrometers). For example for a sensor operating at 433 MHz, the thickness of metal (aluminum) used can be of the order of 1000 angstroms, the metallization period and the electrode width possibly being respectively of the order of 3.5 μm and 2.5 μm.

One of the ports of the transducer is for example linked to a RadioFrequency (RF) antenna and the other is grounded. The field lines thus created between two electrodes of different polarities give rise to surface acoustic waves in the electrode overlap zone.

The transducer is a bi-directional structure, that is to say the energy radiated towards the right and the energy radiated towards the left have the same intensity. By disposing electrodes on either side of the transducer, these electrodes playing the role of reflector, a resonator is made, each reflector partially reflecting the energy emitted by the transducer.

If the number of reflectors is raised, a resonant cavity is created, characterized by a certain resonant frequency. This frequency depends firstly on the propagation speed of the waves under the grating, said speed depending mainly on the physical state of the substrate, and therefore sensitive for example to temperature. In this case, this is the parameter which is measured by the interrogation system and it is on the basis of this measurement that a temperature can be calculated.

It is recalled that the variation of the resonant frequency of a quartz-based resonator is determined by the following formula:

$$f(T) = f_0[1 + CTF_1(T-T_0) + CTF_2(T-T_0)^2] \quad (1)$$

with $f_0$ the frequency at $T_0$, $T_0$ the reference temperature (25° C. by convention), $CTF_1$ the first-order coefficient (ppm/° C.) and $CTF_2$ the second-order coefficient (ppb/° $C.^2$).

It is also possible to reformulate this law by bringing in a temperature of inversion of the law (1), termed the turn-over temperature:

$$f(T) = f_{Tt} + f_0 CTF_2(T - T_{turn-over})^2 \quad (2)$$

with $f_{Tt}$ the frequency at the turn-over temperature and $T_{turn-over}$ the turn-over temperature;
These quantities are given by the following equations:

$$T_{turn-over} = T0 - CTF_1/2CTF_2$$

$$f_{Tt} = f_0[1 - CTF_1^2/4CTF_2] \quad (3)$$

The law for the variation of the resonant frequency as a function of temperature is therefore a parabola; the temperature at which the frequency is a maximum (vertex of the parabola) is called the turn-over temperature.

Figure 1:
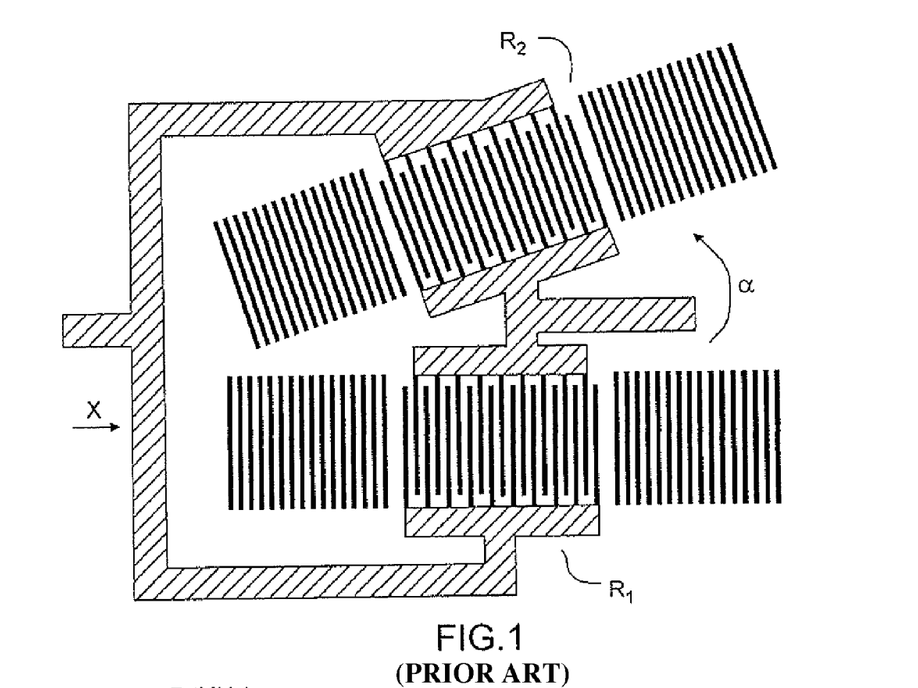
FIG. 1 illustrates an exemplary pair of resonators used in a temperature sensor according to the known art.

It may be particularly beneficial to use two SAW resonators (W. Buff et al., "Universal pressure and temperature SAW sensor for wireless applications" 1997 IEEE Ultra. Symp. Proc.), inclined with respect to one another as illustrated in FIG. 1. In this case, a first resonator $R_1$ for which the direction of propagation of the surface waves is along a direction X corresponding to one of the crystallographic axes of the crystalline substrate, is coupled to a second resonator $R_2$, inclined by a certain angle α (which may typically be of the order of) 20° with respect to the X axis, and therefore using another direction of propagation.

Figure 2:
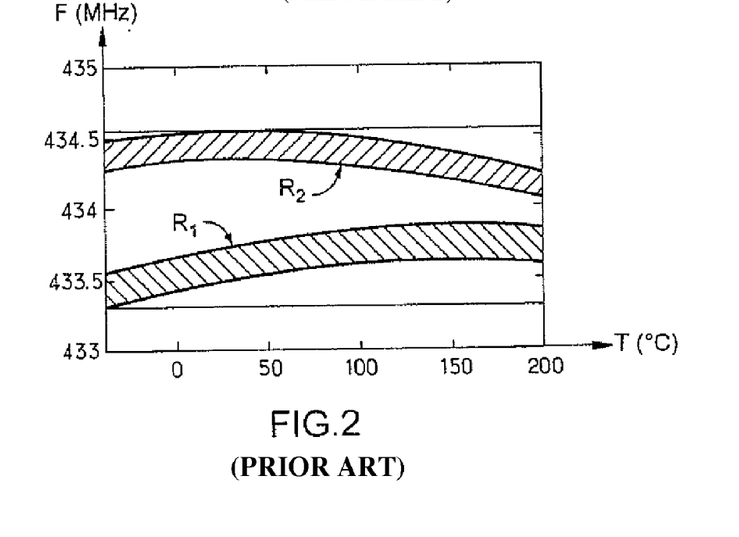
FIG. 2 illustrates the spreads in resonant frequencies as a function of temperature that are due to fabrication for a first resonator and a second resonator that are used in a sensor according to the invention.

By inclining the second resonator with respect to the first resonator, it is endowed with a different sensitivity versus temperature. FIG. 2 illustrates such a behavior by presenting a typical spectral occupancy of the SAW temperature sensor (frequency in MHz as a function of temperature in ° C.).

In the chosen example, the first and second resonators have respectively a turn-over temperature in the vicinity of 150° C. and of 40° C. The space between the 2 lower curves and the 2 upper curves corresponds to the fabrication spread of the order of 250 kHz for this example.

The fact of using a differential structure presents several advantages. The first is that the frequency difference of the resonators is almost linear as a function of temperature and the residual non-linearities are corrected by calibrating the sensor. The other advantage of the differential structure resides in the fact that it is possible to circumvent the major part of the aging effects.

Generally, the temperature sensor uses two resonators $R_1$ and $R_2$ possessing two different directions of propagation.

The frequencies of the two resonators $R_1$ and $R_2$ may be written in accordance with equation (1):

$$f_1 = f_{10}[1 + c_1(\psi_1)\theta + c_2(\psi_1)\theta^2]$$

$$f_2 = f_{20}[1 + c_1(\psi_2)\theta + c_2(\psi_2)\theta^2] \quad (4)$$

with $\theta = T - T_0$ the deviation at ambient temperature, $c_1$ and $c_2$ the coefficients $CTF_1$ and $CTF_2$ and $\psi$ the propagation angle.

The difference between the frequencies of the resonators $R_1$ and $R_2$ gives:

$$\Delta f = f_{10} - f_{20} + \theta(f_{10}c_1(\psi_1) - f_{20}c_1(\psi_2)) + \theta^2(f_{10}c_2(\psi_1) - f_{20}c_2(\psi_2))$$

It is possible to rewrite the second-order equation in $\theta$ in the form:

$$\Delta f = \Delta_0 + s\theta + \epsilon\theta^2 \quad (5)$$

with:

$$\Delta f = f_1 - f_2$$

$$\Delta_0 = f_{10} - f_{20}$$

$$s = f_{10}c_1(\psi_1) - f_{20}c_1(\psi_2)$$

$$\epsilon = f_{10}c_2(\psi_1) - f_{20}c_2(\psi_2) \quad (6)$$

where:
s represents the first-order temperature sensitivity
$\epsilon$ the coefficient of the term of order two
$\Delta f$ the difference of the frequencies at the temperature $\theta$ (difference read out on interrogation)
$\Delta_0$ the difference of the nominal frequencies at the ambient temperature $T_0$.

The aim of the calibration procedure is to determine the three terms: $\Delta_0$, s and $\epsilon$ so as to be able to calculate a posteriori the temperature from a measurement of the frequency difference $\Delta f$. Indeed, solving the second-degree equation in $\theta$ gives:

$$T = T_0 + [-s + (s^2 - 4\epsilon(\Delta_0 - \Delta f))^{1/2}]/2\epsilon \quad (7)$$

In order to facilitate the step of extracting the temperature on the basis of a measurement of difference in resonant frequency, three calibration coefficients $a_0$, $a_1$, $a_2$ which make it possible to calculate the frequency are defined with the aid of equation (8):

$$T = a_0 + (a_1 + a_2\Delta f)^{1/2} \quad (8)$$

The calibration is an operation consisting in determining the coefficients $a_0$, $a_1$ and $a_2$; this operation nevertheless costs a great deal of time since it makes it necessary to measure for each sensor the frequency difference between the two resonators at three different temperatures as a minimum and moreover requires a serialization of each sensor (corresponding to the identification for each sensor of a sensor-calibration coefficients pair).

It is possible for example to envisage storing the calibration coefficients $a_0$, $a_1$, $a_2$ in the interrogation system. Should there be a change of sensor, this configuration requires storage of the new coefficients in the interrogation system.

Together, these constraints are prohibitive in certain cases where objectives of low costs must be achieved.

Generally, the error in the evaluation of the temperature $d\theta$ measured with an SAW sensor with two resonators is given to first order by the following equation:

$$d\theta = (d\Delta_I + d\Delta_0)/S_\theta + \theta S_\theta/S_\theta \quad (9)$$

where
$d\Delta_I$ is the precision of reading the frequency at the interrogation system level
$d\Delta_0$ is the spread of the frequency difference between the 2 resonators at the temperature $T_0$
$S_\theta$ is the typical sensitivity of the sensor (kHz/° C.)
$dS_\theta$ is the sensitivity spread from one sensor to another
$\theta$ is the temperature deviation with respect to $T_0$.

If the error $d\theta$ is estimated for a given temperature $T_0 + \theta$ on the basis of the typical values of the parameters $d\Delta_I$, $d\Delta_0$, $S_\theta$ and $dS_\theta$, an unacceptable value (in relation to the requirements of the applications) is obtained, which makes the calibration operation inescapable.

The largest contribution (greater than 80%) is related to the spread in the frequency difference.

The elements obtained after cutting blanks from the substrate on which the surface wave devices are made and bearing either a single resonator or a set of resonators carrying out the sensor function are called chips. It has already been envisaged to decrease the spread in the frequency variation, by tailoring each of the resonators by quartz or aluminum etching or by silica etching (passivation layer). This method requires the development of a specific process since it is necessary to adjust the frequency of the two resonators on the same chip in an independent manner. The etching precision must moreover be very high in order to meet the frequency spread requirements (typically: +/−5 kHz i.e. control of the order of +/−1 ångström, which is a difficult objective to achieve).

BRIEF SUMMARY OF THE INVENTION

In this context, the present invention proposes a process of collective fabrication making it possible to obtain acoustic wave sensors in an optimized manner without any calibration operation.

More precisely the subject of the invention is a process for the collective fabrication of remotely interrogable sensors, each sensor comprising at least one first resonator and one second resonator, each resonator comprising acoustic wave transducers of a design such that they exhibit respectively a first and a second operating frequency, characterized in that it comprises the following steps:
  the fabrication of a first series of first resonators, said first resonators each comprising a first operating frequency belonging to a first set of frequencies centered on a first mean frequency;
  the fabrication of a second series of second resonators, said second resonators each comprising a second operating frequency belonging to a second set of frequencies centered on a second mean frequency;
  a series of pairings of a first resonator and of a second resonator so as to form pairs of resonators exhibiting a difference of operating frequencies which is equal to the difference of the first and second mean frequencies.

According to a variant of the invention, the fabrication process comprises the following steps:
  the fabrication of first resonators on a first intermediate substrate and the fabrication of second resonators on a second intermediate substrate;

cutting of unit blanks of first and of second chips comprising respectively the first and second resonators from the first and second intermediate substrates;

the pairing of a first and of a second chip;

the assembling of the pairs of chips in a package.

According to a variant of the invention, the process comprises:

the fabrication of first resonators on a first intermediate substrate and the fabrication of second resonators on a second intermediate substrate;

cutting of unit blanks of first and of second chips comprising respectively the first and second resonators from the intermediate substrates;

the assembling of the first chips and of the second chips in individual packages;

the pairing of a first and of a second chip placed previously into a package.

According to a variant of the invention, the pairing step is performed on the basis of the measurement of the resonant frequencies.

According to a variant of the invention, the fabrication process furthermore comprises a prior step of temperature stabilization of the first and second resonators.

According to a variant of the invention, the resonators are made on a piezoelectric intermediate substrate which may typically be quartz, or any other material such as $LiNbO_3$, $LiTaO_3$, langasite and its variants, $GaPO_4$, lithium tetraborate, $KNbO_3$, finally in a generic manner any piezoelectric substrate liable to exhibit cuts that are compensated and not compensated for the effects to be measured.

Advantageously the fabrication process of the invention makes it possible to manufacture remotely interrogable temperature sensors.

According to a variant of the invention, the first resonators are oriented on the first intermediate substrate in a first direction, the second resonators are oriented on the second intermediate substrate in a second direction, said directions corresponding to the directions of propagation of the surface waves, this being done in such a way that the first direction makes a nonzero angle with the second direction.

An alternative solution consists in making the first resonators and the second reconators on the surface of the first and the second intermediate substrate using a different crystal, e.g., quartz, cut and having an identical propagation angle for each resonator. It is finally possible to use cuts and directions of propagation which differ so as to exploit the particular properties of certain orientations that are able to minimize the sensitivity of the thermal characteristics of the frequency to these geometric parameters.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Generally, the fabrication process according to the invention uses the natural spread in fabrication, so as to pair a first resonator made on a first intermediate substrate with a second resonator made on a second intermediate substrate, doing so in order to preserve a constant frequency difference between the two resonators.

Figure 3:
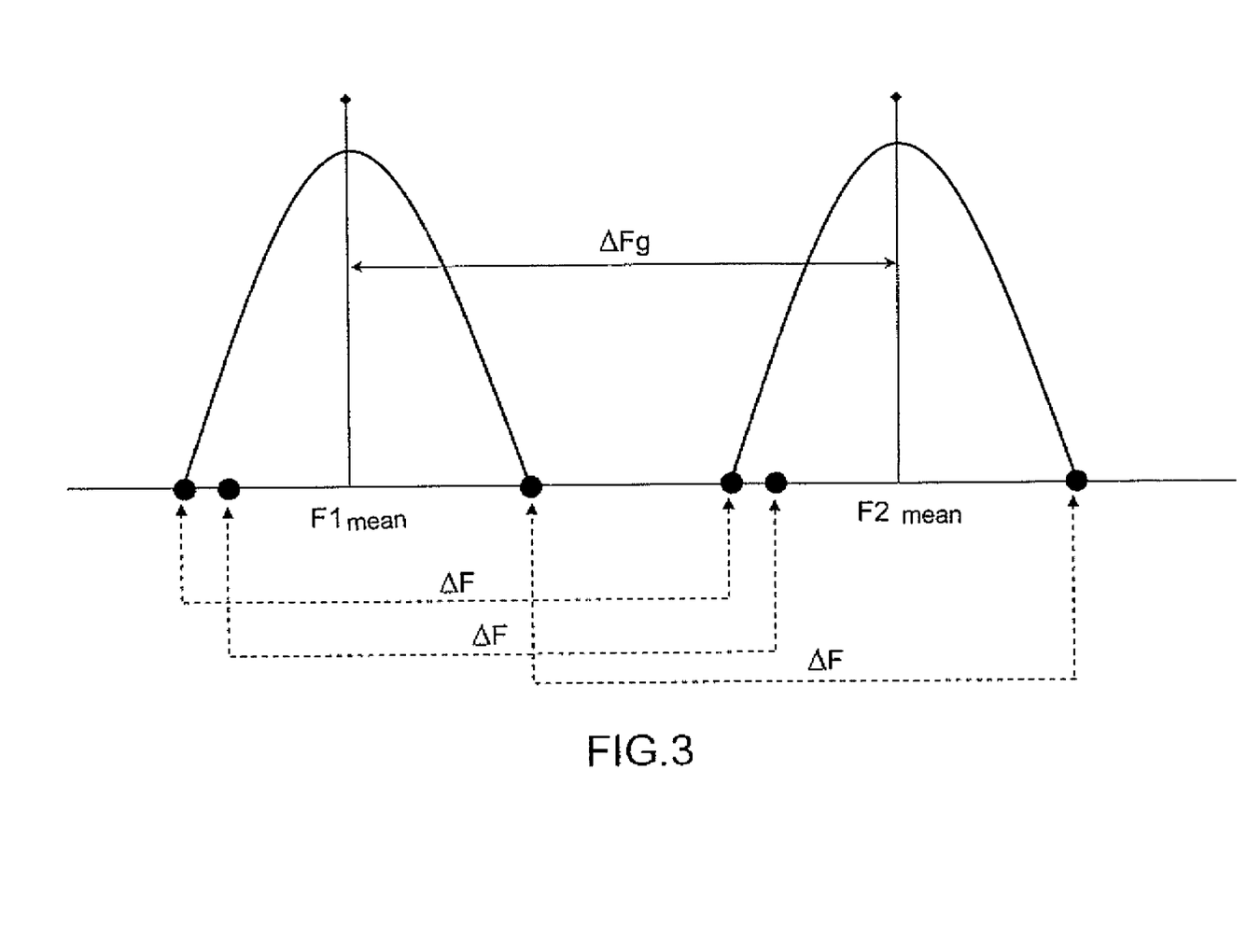
FIG. 3 illustrates the frequency spread for a set of first resonators and a set of second resonators used in an SAW temperature sensor obtained according to the process of the invention.

FIG. 3 shows diagrammatically examples of spread obtained with two intermediate substrates on which a set of resonators have been made.

More precisely, $F_1$ and $F_2$ being the resonant frequencies of the two resonators, there exist two frequency distributions associated with a certain quantity of fabricated pieces ($N_1$ pieces of first resonators $RT_{1i}$, and $N_2$ pieces of second resonators $RT_{2j}$). Each distribution is characterized by a mean value $F_{1mean}$ and $F_{2mean}$ which corresponds to the maximum of the distribution if a normal distribution is considered for greater simplicity.

If the resonators $RT_{1i}$, and $RT_{2j}$ are fabricated with the same technological characteristics respectively on intermediate substrates $RT_1$ and $RT_2$, the following equation is satisfied:

$$F_{2mean} - F_{1mean} = \Delta Fg \quad (10)$$

In this case the mean frequency deviation between the two distributions depends solely on the difference between the metallization periods of the two resonators, these being fixed by the design of the mask. This deviation is equal to the objective frequency deviation $\Delta Fg$.

The extent of the frequency distributions $F_1$ and $F_2$ being substantially the same, it is then possible to pair almost all the first frequency resonators $F_1$ with the second frequency resonators $F_2$ so that any pair thus formed satisfies the following relation:

$$(F_{2j} - F_{1i}) \in [\Delta Fg - \delta, \Delta Fg + \delta] \quad (11)$$

and $\delta$ represents the allocated tolerance in the frequency deviation and is limited by the precision of the electrical measurement used for the pairing. A typical tolerance of $\delta = 5$ kHz is achievable.

According to a first variant of the invention, it is proposed that the two types of resonators be paired before assembling them in a single package.

For this purpose, series of two different resonators are made on piezoelectric intermediate substrates. Advantageously, the chips of the first series and those of the second series exhibit the same size.

Typically, the resonators can be designed with a metallization rate, that is to say a ratio of the electrode width to the metallization period, that is optimized in such a way that the resonant frequency depends only on the metal thickness deposited and in a non-significant manner on the variations in the electrode width. Advantageously, it is sought to minimize the sensitivity of the frequency to the technological parameters, i.e. the per-period metallization ratio and if appropriate the metallization thickness. For the (YX)/36° quartz cut and a relative metallization thickness (defined as the ratio of the thickness of the electrode to twice the period of the grating which thus corresponds to the acoustic wavelength) of between 1 and 5%, a metallization ratio of between 0.55 and 0.75 turns out to be the most advantageous in this regard.

Figure 4:
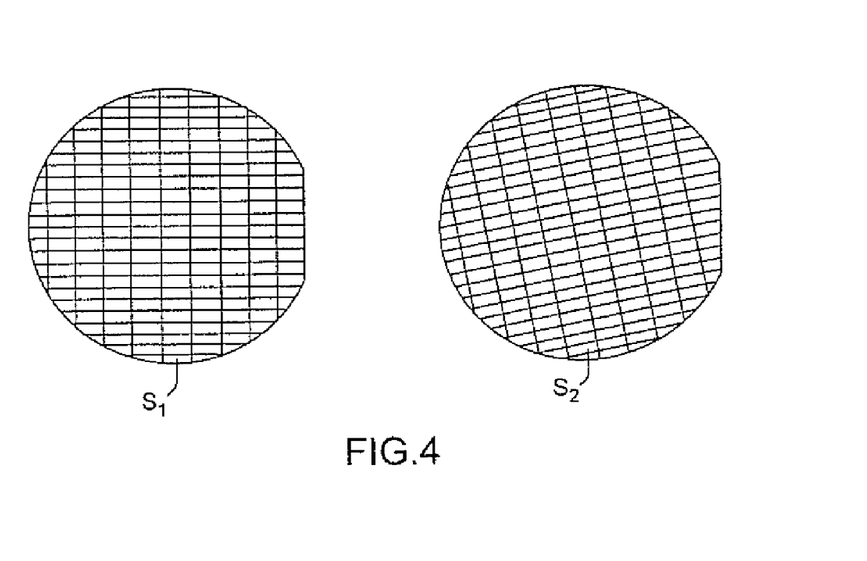
FIG. 4 illustrates two intermediate substrates used in the collective fabrication process of the invention and comprising directions of propagation of the surface waves along different directions.

According to this first variant, a typical fabrication batch (for example 25 wafers) is fabricated using the standard process for depositing metallic layers and photolithography process that are used for SAW resonators. The wafers of type $S_1$ and $S_2$ are fabricated as far as possible under the same conditions, and are illustrated in FIG. 4, which highlights the making of the two resonator types. Each resonator exhibits a different direction of propagation with respect to the X axis (horizontal axis in FIG. 4 perpendicular to the flat). The lines correspond to the boundaries of each chip.

The wafers used for the two types of resonators stem in particular from the same quartz block from which the wafers are extracted following a cutting operation so as to minimize the frequency variations related to the tolerances on the angles of cut and of propagation.

The metallic deposition for making the electrode combs for the two types of resonators is performed within the framework of the same fabrication batch (alternation of first $S_1$ and of second $S_2$ intermediate substrates).

Together, these conditions lead to minimizing the deviation:

$$F_{2mean} - F_{1mean} - \Delta Fg$$

Figure 5:
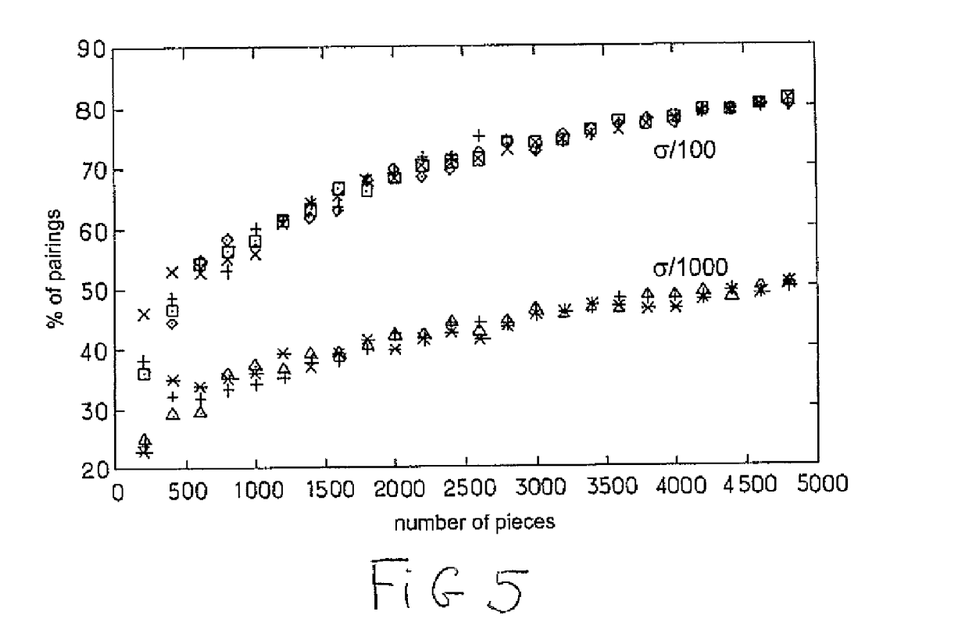
FIG. 5 illustrates the pairing efficiency for pairs of resonators used in the invention, as a function of the number of pieces fabricated.

If the pairing efficiency is evaluated as a function of the number of pieces fabricated, such as illustrated in FIG. 5, it is noted that the curve is asymptotic and that the bigger the numbers of pieces to be paired $N_1$, $N_2$, the higher the expected efficiency.

It is moreover observed that the lower the allocated tolerance in the frequency deviation $\delta$, the lower the pairing efficiency. The 2 curves of FIG. 2 show an exemplary pairing for $\delta = \sigma/100$ and $\delta = \sigma/1000$ where $\sigma$ is the standard deviation of the frequency distributions $F_1$ and $F_2$ assumed to be Gaussian.

This observation suggests that the number of pieces to be paired be increased beyond the size of a single fabrication batch and consequently that resonators of different fabrication batches be paired.

Within the framework of calibration-free sensor applications, the allocated tolerance in the frequency deviation $\delta$ is very low (of the order of a few kHz).

A difference in variation of a few parts per million (ppm) between the two resonant frequencies after pairing (natural aging of the chip, variations generated by assembly, etc.) may consequently compromise the result of this pairing.

It is therefore judicious to perform the pairing as late as possible in the fabrication of the component and to try as far as possible to stabilize the component before pairing.

Within the framework of this first variant of the invention, the fabrication steps are advantageously performed in the following order:
- the fabrication of the wafers $S_1$ and $S_2$
- the cutting of a unit blank of the chips corresponding to unit resonators from said wafers
- the stabilization of the cut chips by a thermal route based predominantly on stoving at constant temperature
- the pairing on the basis of an electrical measurement using tips
- the assembling of the pairs in a single package with a standardized and reproducible adhesive bonding process so as to minimize the spread in sensitivity (kHz/° C.)
- the closing of the package enclosing the pairs of resonators
- the stabilization of the final component by a thermal route based on phases of temperature cycling and stoving at constant temperature.

Figure 6:
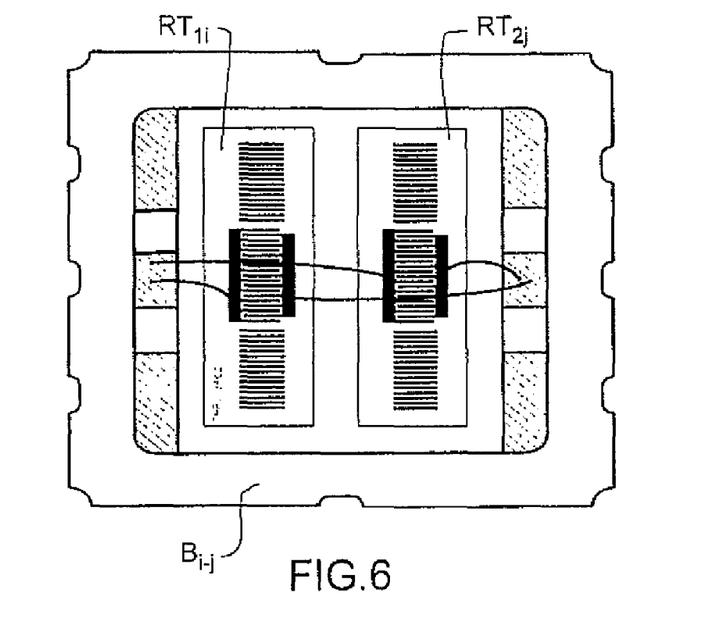
FIG. 6 illustrates the pairing of two resonators, according to a first variant of the invention in which the two resonators are assembled in a single package

FIG. 6 illustrates this first variant of the invention, in which the process leads to assembling pairs of resonators $RT_{i1}$ and $RT_{j2}$ in one and the same package Bi-j.

According to a second variant of the invention, it is also proposed to undertake initially the making of the whole set of unit chips, to assemble each of the chips in a unit package, and then to carry out the pairing operation. A series of pairs of first and second resonators is thus obtained.

Figure 7:
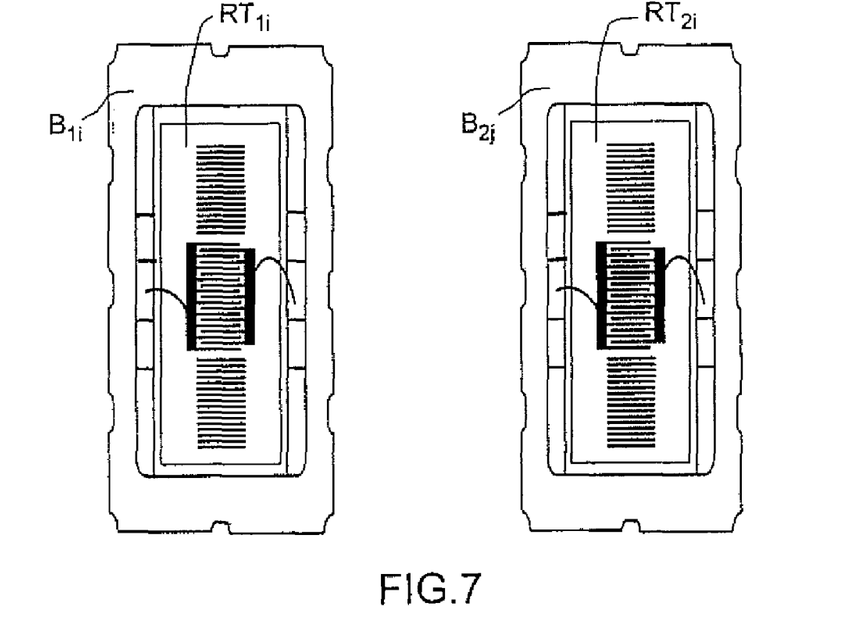
FIG. 7 shows the pairing of two resonators, according to a second variant of the invention in which the two resonators are assembled in two independent packages.

FIG. 7 illustrates this second variant of the invention in which the resonators $RT_{i1}$ and $RT_{j2}$ are paired in two different packages $B_{1i}$ and $B_{2j}$.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A process for a collective fabrication of remotely interrogable sensors, each sensor comprising at least one first resonator and at least one second resonator, each of the at least one first resonator and each of the at least one second resonator comprising acoustic wave transducers and of a design such that the at least one first resonator and the at least one second resonator exhibit respectively a first and a second operating frequency, comprising the following steps:
   fabricating a first series of first resonators, each of said first resonators comprising the first operating frequency belonging to a first set of frequencies centered on a first mean frequency;
   fabricating a second series of second resonators, each of said second resonators comprising the second operating frequency belonging to a second set of frequencies centered on a second mean frequency; and
   a series of pairings of a first resonator and of a second resonator so as to form pairs of resonators exhibiting a difference of operating frequencies which is equal to a difference of the first and second mean frequencies.

2. The fabrication process as claimed in claim 1, comprising the following steps:
   the fabrication of first resonators on a first intermediate substrate and the fabrication of second resonators on a second intermediate substrate;
   cutting of unit blanks of first and of second chips comprising respectively the first and second resonators from said intermediate substrates;
   pairing of a first and of a second chip; and
   the assembling of the pairs of chips in a package.

3. The fabrication process as claimed in claim 2, wherein the pairing step is performed by measuring the resonant frequencies.

4. The fabrication process as claimed in claim 2, wherein the resonators are made on a quartz intermediate substrate.

5. The fabrication process as claimed in claim 2, wherein the sensor is a temperature sensor.

6. The fabrication process as claimed in claim 2, wherein the first resonators and second resonators are made on the surface of a first and of a second intermediate substrate of different crystal cut, the directions of propagation of the surface waves being identical on the two intermediate substrates.

7. The fabrication process as claimed in claim 2, wherein the resonators are of surface wave resonator type.

8. The fabrication process as claimed in one claim 2, wherein the resonators are of bulk wave resonator type.

9. The fabrication process as claimed in claim 1, comprising:
fabricating first resonators on a first intermediate substrate and fabricating of second resonators ($RT_{i2}$) on a second intermediate substrate;
cutting unit blanks of first and of second chips comprising respectively the first and second resonators from said intermediate substrates;
assembling an individual package of the first chips and of the second chips; and
pairing a first and a second chip placed previously into the individual package.

10. The fabrication process as claimed in claim 9, wherein the pairing step is performed by measuring the first and second operating frequencies.

11. The fabrication process as claimed in claim 9, wherein the sensor is a temperature sensor.

12. The fabrication process as claimed in claim 1, wherein each of the series of pairings is performed by measuring the first and second operating frequencies.

13. The fabrication process as claimed in claim 1, further comprising stabilizing a temperature of the first and second resonators.

14. The fabrication process as claimed in claim 1, wherein the resonators are formed on a quartz intermediate substrate.

15. The fabrication process as claimed in claim 1, wherein the sensor is a temperature sensor.

16. The fabrication process as claimed in claim 1, wherein the first resonators are oriented on a first intermediate substrate in a first direction, the second resonators are oriented on a second intermediate substrate in a second direction, said first and second directions corresponding to directions of propagation of the surface waves, wherein the first direction makes a nonzero angle with the second direction.

17. The fabrication process as claimed in claim 1, wherein the first resonators and second resonators are respectively formed on a surface of a first and of a second intermediate substrate of different crystal cut, the directions of propagation of the surface waves being identical on the first and second intermediate substrates.

18. The fabrication process as claimed in claim 1, wherein the first and second resonators are of surface wave resonator type.

19. The fabrication process as claimed in one claim 1, wherein the first and second resonators are of bulk wave resonator type.

* * * * *